(12) United States Patent
Liedtke

(10) Patent No.: US 6,260,130 B1
(45) Date of Patent: *Jul. 10, 2001

(54) CACHE OR TLB USING A WORKING AND AUXILIARY MEMORY WITH VALID/INVALID DATA FIELD, STATUS FIELD, SETTABLE RESTRICTED ACCESS AND A DATA ENTRY COUNTER

(75) Inventor: Jochen Liedtke, Sankt Augustin (DE)

(73) Assignee: International Business Machine Corp. International Property Law, Yorktown Heights, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/737,140
(22) PCT Filed: May 11, 1995
(86) PCT No.: PCT/EP95/01780
§ 371 Date: Nov. 8, 1996
§ 102(e) Date: Nov. 8, 1996
(87) PCT Pub. No.: WO95/31783
PCT Pub. Date: Nov. 23, 1995

(30) Foreign Application Priority Data

May 11, 1994 (DE) .................................... 44 16 658

(51) Int. Cl.[7] .................................................... G06F 12/00
(52) U.S. Cl. ........................... 711/206; 711/117; 711/135; 711/144; 711/200; 711/205
(58) Field of Search .................................. 711/121, 200, 711/205, 207, 117, 118, 3, 135, 206, 136, 144

(56) References Cited

U.S. PATENT DOCUMENTS

| | | | |
|---|---|---|---|
| 4,849,881 | * 7/1989 | Eguchi . | |
| 5,222,222 | * 6/1993 | Mehring et al. | 711/205 |
| 5,265,227 | * 11/1993 | Kohn et al. | 711/207 |
| 5,276,848 | * 1/1994 | Gallagher et al. | 711/121 |
| 5,282,274 | * 1/1994 | Liu | 711/206 |
| 5,491,806 | * 2/1996 | Horstmann et al. | 711/207 |
| 5,546,555 | * 8/1996 | Horstmann et al. | 711/207 |
| 5,627,987 | * 5/1997 | Nozue et al. | 711/200 |
| 5,764,944 | * 6/1998 | Hwang et al. | 711/207 |
| 5,802,568 | * 9/1998 | Csoppenszky | 711/136 |
| 5,835,962 | * 11/1998 | Chang et al. | 711/206 |

* cited by examiner

*Primary Examiner*—Tuan V. Thai
(74) *Attorney, Agent, or Firm*—Akin, Gump, Strauss, Hauer & Feld, L.L.P.

(57) ABSTRACT

The memory device includes an auxiliary memory and a useful memory. Both memories are provided with a plurality of memory entries. The auxiliary memory is intended for storing regions of an address space therein. This includes a plurality of addresses with which the useful memory may be addressed. A write/read access to a useful memory entry is not possible if a status field associated with the useful memory entry signals a restricting status and the address with which the useful memory entry is addressed lies within at least one of the address space regions stored in the auxiliary memory. Efficient region-selective flushing of the useful memory is possible with this procedure.

3 Claims, 8 Drawing Sheets

CACHE OR TLB USING A WORKING AND AUXILIARY MEMORY WITH VALID/INVALID DATA FIELD, STATUS FIELD, SETTABLE RESTRICTED ACCESS AND A DATA ENTRY COUNTER

The invention refers to a memory device for storing data. In particular, the invention refers to a cache or a translation lookaside buffer (TLB), the innovation being a flush buffer, in particular a flush buffer operating in parallel, which allows the flushing of larger and smaller portions without having to flush the entire TLB or cache.

Modern processors use TLBs for a fast translation of virtual addresses into physical addresses. Typically, the TLB and the cache are provided on the processor chip. In physically indexed caches they are arranged in series (FIG. 4), in virtually indexed and physically tagged caches they are arranged in parallel (FIG. 5).

Figure 6:
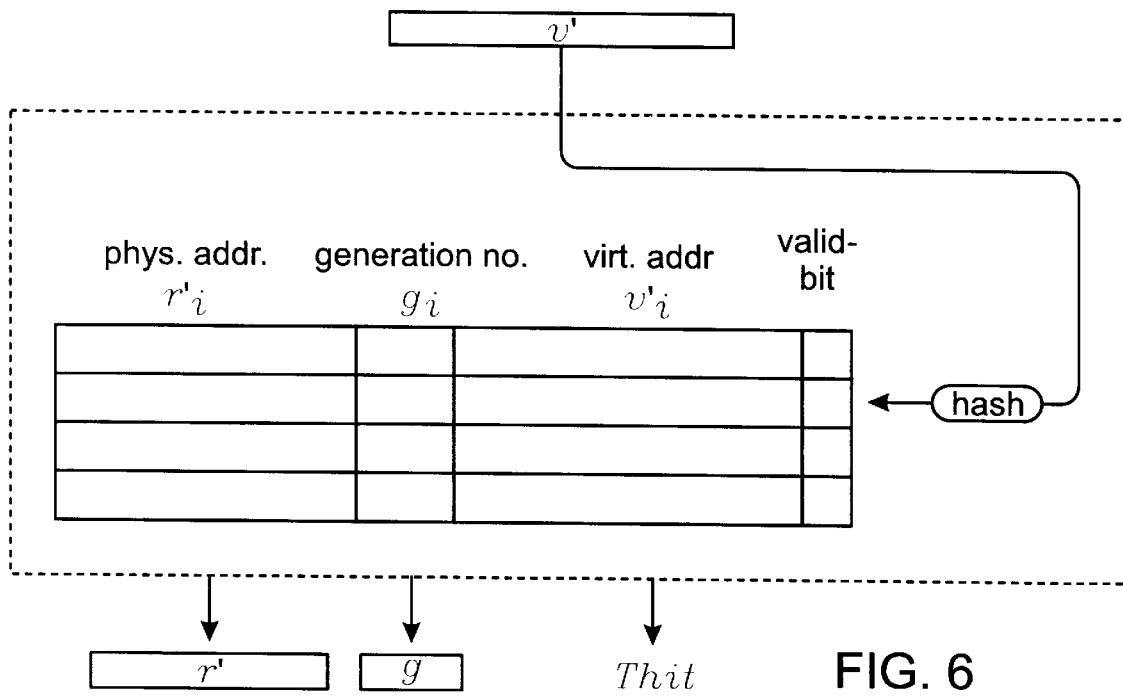

Here, the TLB is a special cache for address translation. Fully associative TLBs are also employed, as a rule, however, TLBs are n-way set-associative. FIG. 6 illustrates a direct mapped TLB, i.e., a 1-way set-associative TLB. The higher-value part v' of the virtual address v is used to index a line (memory entry) of the TLB. Located there are the virtual page address $v'_i$ associated to this entry, the physical page address $r'_i$, as well as status bits not mentioned in FIG. 6, which, among other things, indicate whether the entry is valid at all. If it is valid and $v'_i$ matches the present page address v', there is a TLB hit and the physical address is assembled from the lower-value part v" of the virtual address and the physical page address $r'_i$ supplied by the TLB.

A n-way set-associative TLB differs from a direct mapped TLB in that a line holds a plurality of entries that are indexed simultaneously and checked in parallel against v'. There is a hit, if one of these entries is correct; then, the $r'_i$ and status bits thereof are used to form the physical address r and for validation of the access.

TLBs shorten the process of address translation. When the defining address mapping process, i.e., one or a pluarlity of page table entries, is modified, consistency requires the nullification ("flushing") or a corresponding alteration of those TLB entries that are affected by the modification.

Should the modification of the address map refer to only a single page, it is sufficient to flush or alter the respective entry, as long as it is within the TLB. Since this will concern one TLB entry at most, the effort can be compared to a normal translation step of the TLB: the TLB is addressed using the virtual page address, and in case of a hit, the entry is made invalid or modified.

With modifications that concern larger fields, this method soon becomes to complex. For a virtual field of m pages, m steps would be needed. In fully-associative TLBs, the problem can be solved efficiently by a parallel limited flushing of all TLB entries. Unfortunately, the hardware requirements are generally too demanding for that.

With n-way set-associative TLBs, scanning the entire TLB is expensive and cannot be scaled, k/n steps for a TLB with k entries. Therefore, in such cases, the entire TLB is flushed which can be done in one step. With the TLB size increasing, this becomes ever less interesting because of the TLB misses indexed thereby.

It is the object of the invention to provide a memory device, in particular a n-way set-associative cache or TLB, which allows the flushing of larger address space regions (virtual regions) in an efficient manner.

In order to solve this object, the invention proposes a memory device with the features of claim 1. The features of advantageous embodiments of the invention are mentioned in the dependent claims, respectively.

The memory device of the present invention comprises a useful memory containing a plurality of memory entries addressable by means of addresses. Then useful memory can be, for example, a cache memory or a translation lookaside buffer that may be seen as a special cache memory for address translation. Specifically, the useful memory of the present invention has substantially fewer memory entries than the address space has addresses for addressing the useful memory. Each memory entry is provided with a data field in which one or a plurality of data words may be stored. In addition to the data field, each memory entry has a status field that may be transferred into at least one restricting status for restricting a write/read access to the data field and into a non-restricting status for not restricting a write/read access to the data field. Further, each memory entry has further fields, in particular a tag field and a valid/invalid field. When addressing the useful memory, the address or parts thereof are compared with the contents of the tag fields of all addressed entries of the useful memory. In case of a match with a tag field, a write/read access may then be had to the data field, if, on the one hand, the same is marked as valid by the valid/invalid field and, either, the status field is in a non-restricting status or the status field is in a restricting status, and the address used in indexing the useful memory is not part of at least one address space field stored in the auxiliary memory.

Moreover, the present memory device comprises an auxiliary memory containing one or a plurality of memory entries, into which data may be stored that quantify a region of the address space. Using this auxiliary memory (also referred to as flush lookaside buffer, abbreviated as FLB), the useful memory may be flushed efficiently in a region-selective manner, namely in a single operation step.

The method for a region-selective flushing of the useful memory is as follows: Upon storing an address space region in the auxiliary memory, the status fields of all useful memory entries are transferred into a restricting status. Upon a subsequent addressing of a useful memory entry, no write/read access to the data field of this useful memory entry may be had, if the address is within at least one address space region stored in the auxiliary memory and if the status field is in a restricting status. In order to determine this, it is checked whether the address used for addressing the useful memory entry is comprised by at least one address space region stored in the auxiliary memory. If this is true, the auxiliary memory outputs a signal (also referred to hereinafter as Fhit) indicating this condition. In other words, after a flushing of the useful memory, access may still be had to the data fields of all useful memory entries that are addressable using an address that is not comprised by at least one address space region stored in the auxiliary memory. When implementing the useful memory as a TLB or cache, time consuming table walk or main memory accesses for the useful memory entries not concerned by the selective flushing may be avoided, the hardware and software efforts being comparatively low, since all that must be provided besides the useful memory is an auxiliary memory and the memory entries in the useful memory have to be added with the status field, these status fields being such that, upon a central command, if desired, they can be simultaneously transferred into a restricting status and selectively be transferred into a non-restricting status.

Advantageously, when storing a useful memory entry, upon which the same is initialized (as a rule, data are written into the useful memory entry and the same is then tagged as valid), the status field of the respective useful memory entry is transferred into a restricting status exactly if the address with which the useful memory entry has been addressed is not part of at least one address space region stored in the auxiliary memory. If, however, the address is part of at least one address space region stored in the auxiliary memory, the status field of the addressed useful memory entry is transferred into a non-restricting status.

As an alternative, the status field of an addressed useful memory entry may always be transferred into a non-restricting status upon a storing access, independent of whether the address used for the addressing is a part of at least one address space region stored in the auxiliary memory. Should the status field of an addressed useful memory entry be in a restricting status prior to the addressing (which is the case in particular when initializing the useful memory or after each flushing) and if the address used for the addressing is not part of at least one address space region stored in the auxiliary memory, the status field will be transferred into a non-restricting status upon addressing so that from this moment on until the transfer of the status field into the restricting status an interrogation of the auxiliary memory is no longer necessary when addressing the useful memory entry.

Suitably, when writing data specifying a region of the address space into an auxiliary memory entry, the status fields of all useful memory entries are transferred into a restricting status. Preferably, the auxiliary memory has a plurality of memory entries. When an overflow of the auxiliary memory occurs, all useful memory entries and all auxiliary memory entries are advantageously tagged as invalid. It should be noted that in the technical circuit implementation each auxiliary memory entry has a valid bit indicating whether the data stored in the auxiliary memory entry are valid or not. Such a valid bit is also provided in each useful memory entry (referred to before as the valid/invalid field).

Advantageously, prior to each storing of an address space region in an auxiliary memory entry, the address space region to be stored is checked for overlaps with address space regions already stored in the auxiliary memory. If the intersection of the combination of all address space regions stored in the auxiliary memory and the new address space region to be stored equals the latter, the new address space region does not have to be stored again in the auxiliary memory; rather, it will suffice to switch the status fields of all useful memory entries to a restricting status. The auxiliary memory can then be used without any change. If, on the other hand, an address space region is stored in the auxiliary memory, for example, which lies entirely within the address space region to be stored additionally, the latter being larger than the address space region already stored, or if the former overlaps with the address space region to be stored or adjoins the same (with or without a distance therebetween), the auxiliary memory entry in which the address space region already stored is contained may be overwritten with the data specifying the new address space region to be stored. The useful memory is selectively flushed again in the usual way by transferring the status fields of all useful memory entries into a restricting status. The above considerations apply correspondingly to a comparison of the new address space region to be stored and the union of all address space regions already stored in the auxiliary memory.

The above described operations in the auxiliary memory intend to make optimum use of the auxiliary memory, so as to prevent the auxiliary memory from overflowing too fast. In other words, this embodiment of the invention the existing auxiliary memory entry or entries and/or the new auxiliary memory entry are always updated or selected such that at least all address space regions specified by the previous and the new data are stored in the auxiliary memory.

Preferably, the status fields of all useful memory entries can be switched simultaneously to a restricting status, independent of an operation in the auxiliary memory and independent of the status thereof.

In the simplest form of implementation of the status field, the same is in the form of a 1-bit-field which may be set and reset to specify the restricting status or the non-restricting status.

An implementation of the status field that is an alternative to the above described embodiment provides that the status field comprises a plurality of bits and that "generation numbers" can be stored in the status field. In this case, the present memory device comprises a generation number counter incremented every time an address space region is stored in an auxiliary memory entry. Each auxiliary memory entry is completed by one generation number field. In the instance an address space region is stored in an auxiliary memory entry, the generation number field of this auxiliary memory entry is set to the value the generation number counter held before the incrementation. The status field of a useful memory entry to which a storing access is had, is set to the present value of the generation number counter. Whether the status field of an addressed useful memory entry is in the restricting status or the non-restricting status will then be determined by comparing the value of the status field to the value of the generation number field of the auxiliary memory entry in which the address space region is stored that includes the address used to address the useful memory entry. The non-restricting status is given exactly if the value of the status field is higher than the value of the generation number field of the respective auxiliary memory entry. Thus, the status field values of the useful memory entries and the generation number field entries always indicate which of the two entries is more recent (the auxiliary memory entry or the useful memory entry with the address lying within the address space region specified by the auxiliary memory entry). As a function thereof, the status field is in a non-restricting status or a restricting status.

According to the invention, it is basically possible that the address by which a useful memory entry is addressed lies within a plurality of address space regions stored in the auxiliary memory. In case that the address of an addressed useful memory entry lies within the address space regions specified by the data of a plurality of auxiliary memory entries, the status field of the addressed useful memory entry, when realizing the non-restricting status or restricting status of the status fields by comparing generation numbers of the useful memory and the auxiliary memory, is in a non-restricting status if the value of the status field is higher than the highest value of the generation number stored in the generation number fields of those auxiliary memory entries in which the address space regions containing the address used to address the useful memory entry are stored. Otherwise, the status field of the addressed useful memory entry is in a restricting status.

Preferably, the generation number counter is only incremented upon a storing of an address space region in a auxiliary memory entry if the address space region overlaps with one or a plurality of address space regions already stored in the auxiliary memory. Thus, the total of generation numbers that can be accorded may be reduced, resulting in the advantage that the corresponding generation number fields of the auxiliary memory and the status fields of the useful memory can be made smaller.

When the auxiliary memory overflows, i.e., no further address space regions can be stored in the auxiliary memory, all useful memory and auxiliary memory entries are tagged as invalid and, further, the generation number counter is reset. Resetting the generation number counter and tagging all useful memory and auxiliary memory entries as invalid is also performed when the generation number counter exceeds a predeterminable maximum value.

Figure 1:
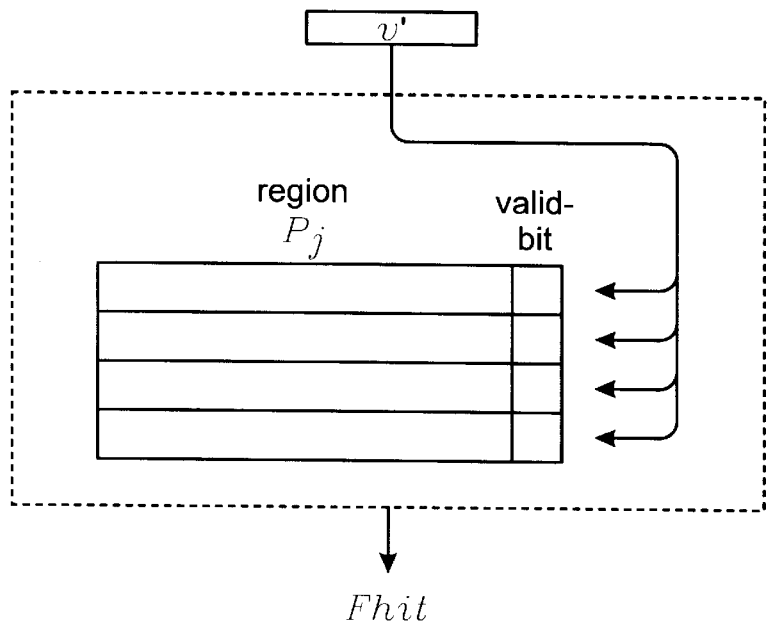
Figure 2:
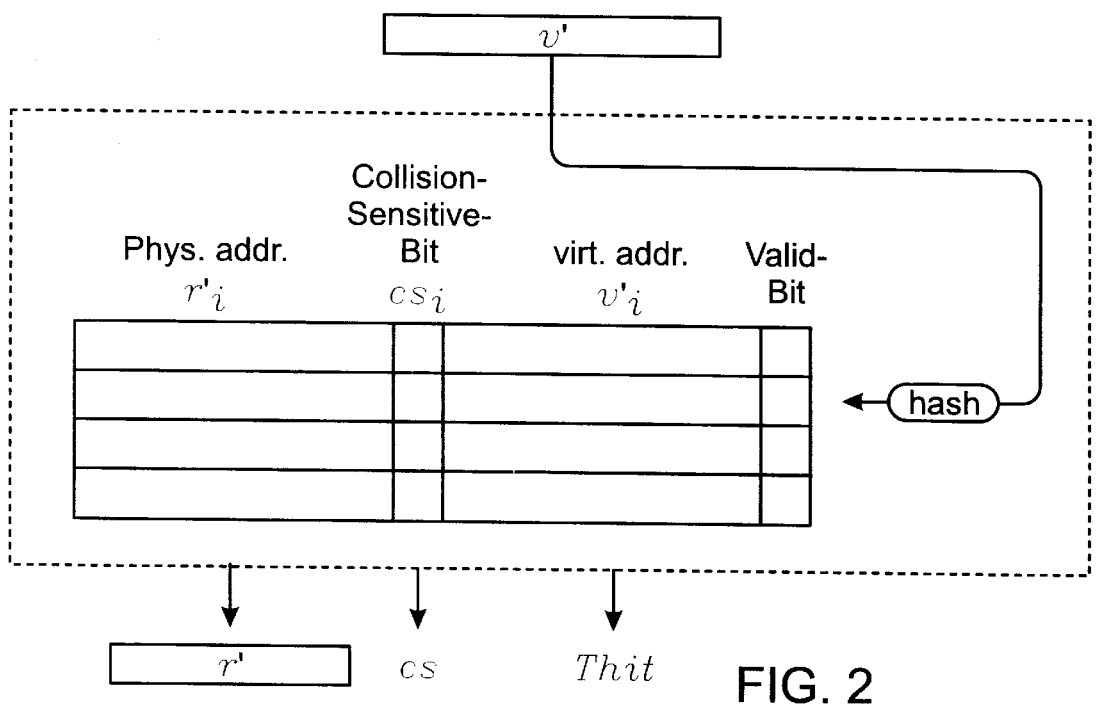
Figure 3:
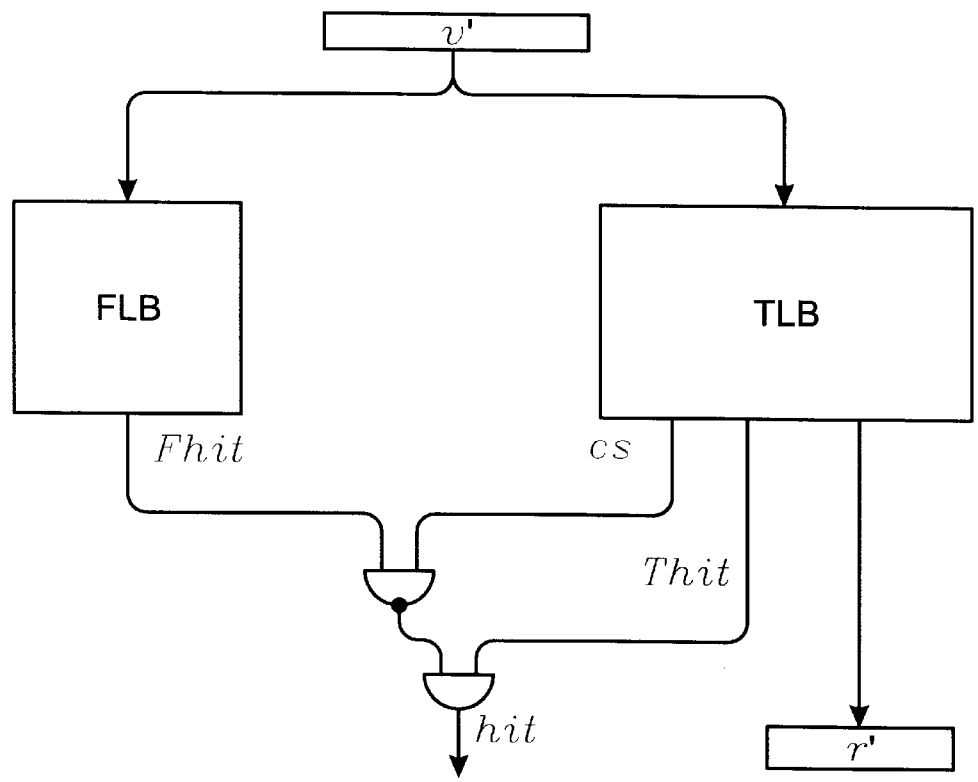
Figure 4:
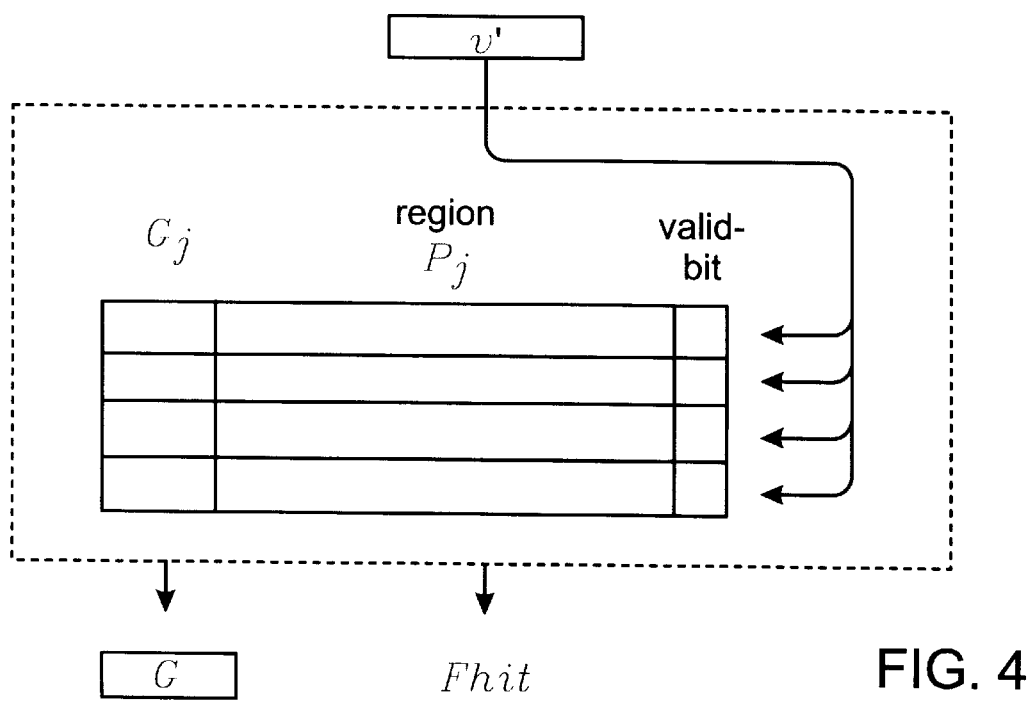
Figure 5:
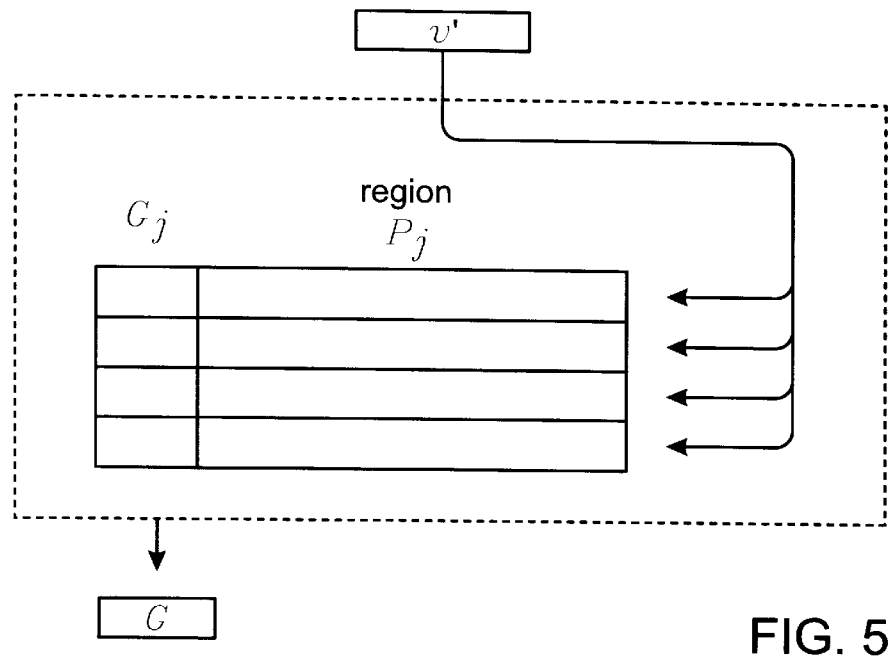
Figure 7:
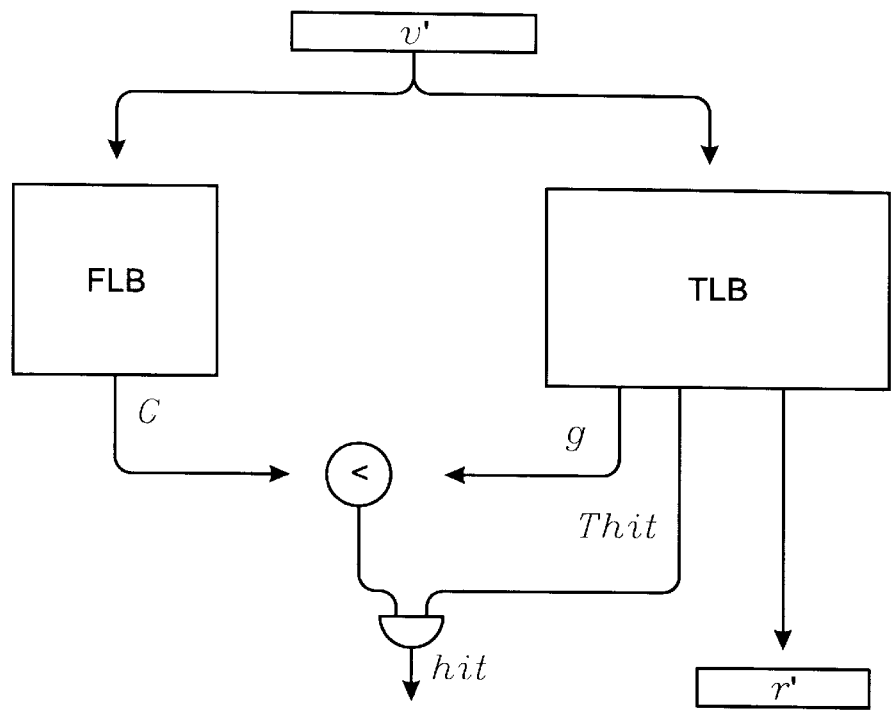
Figure 8:
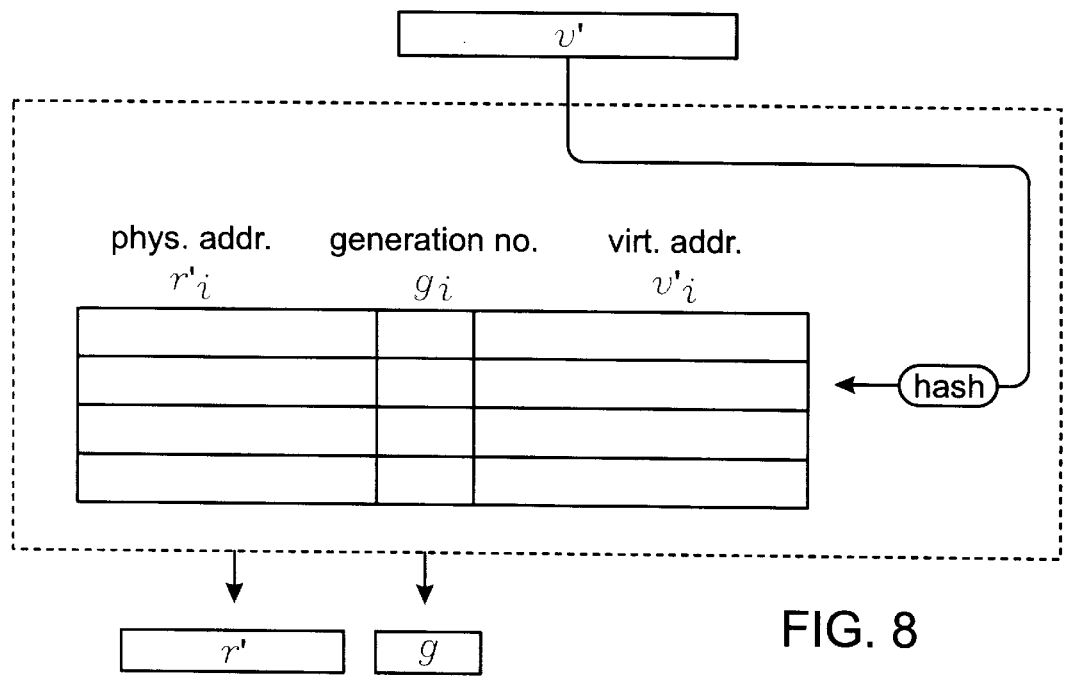
Figure 9:
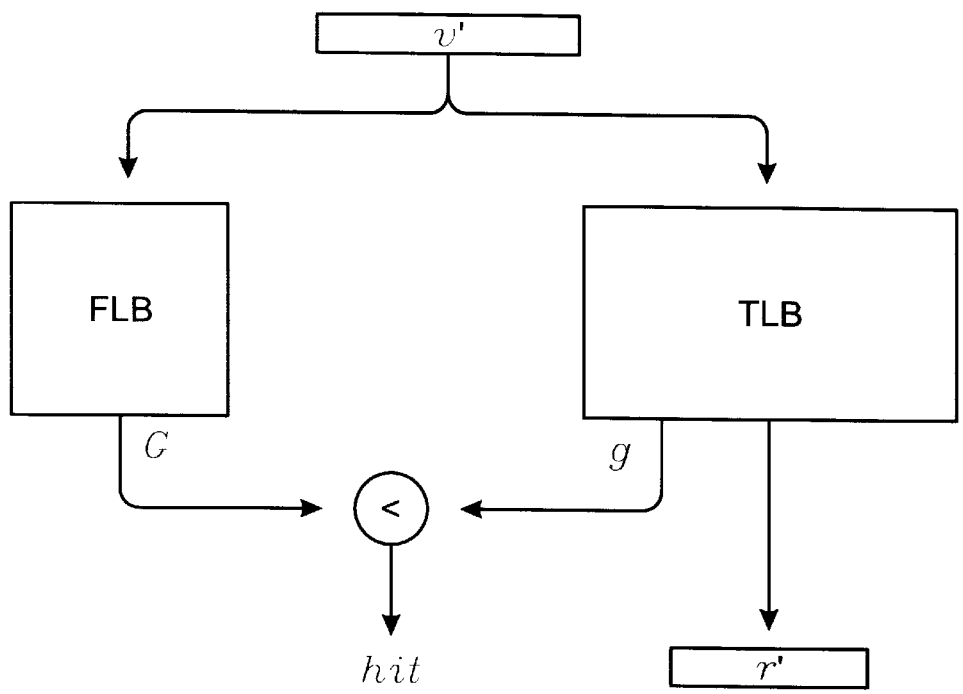
Figure 10:
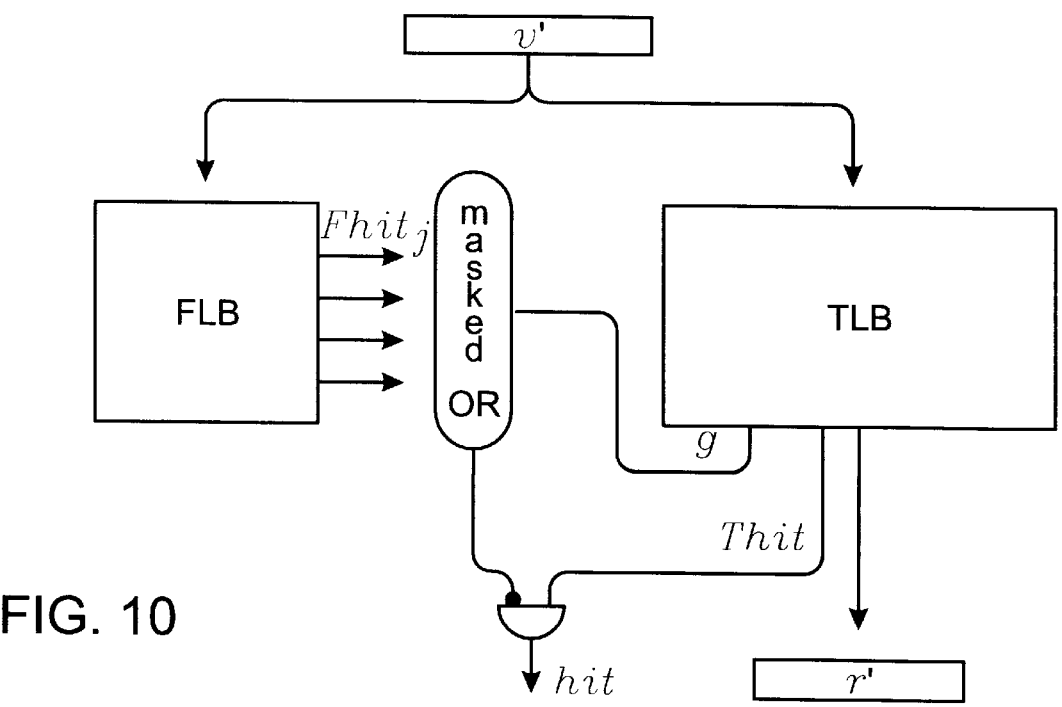
Figure 11:
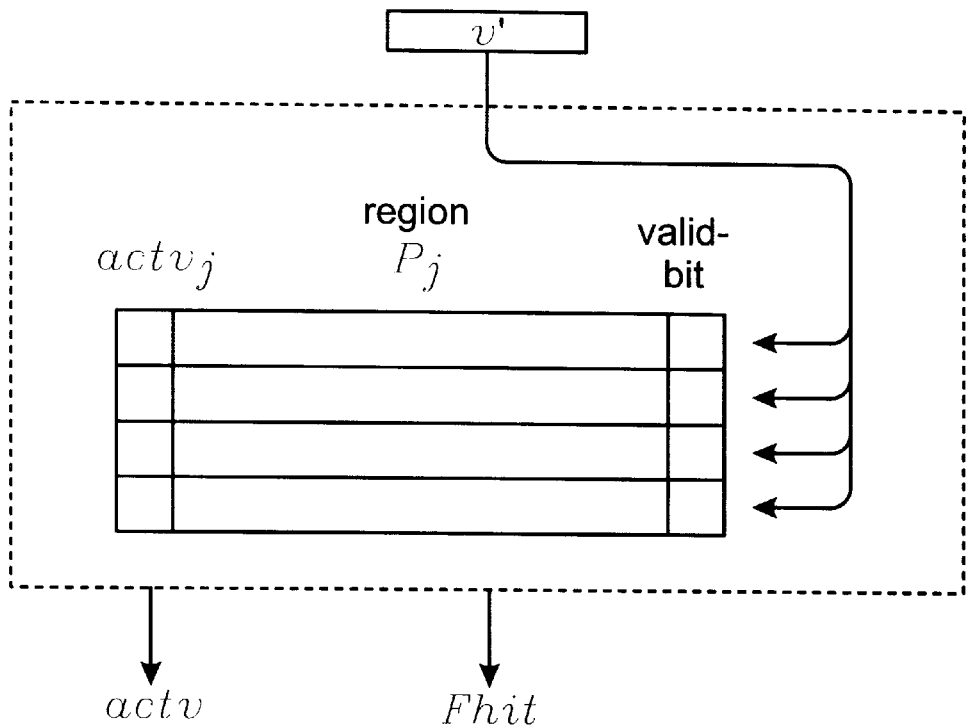
Figure 12:
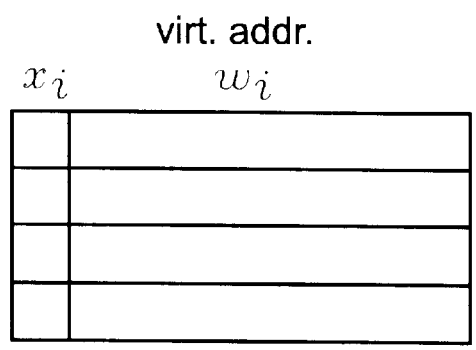
Figure 13:
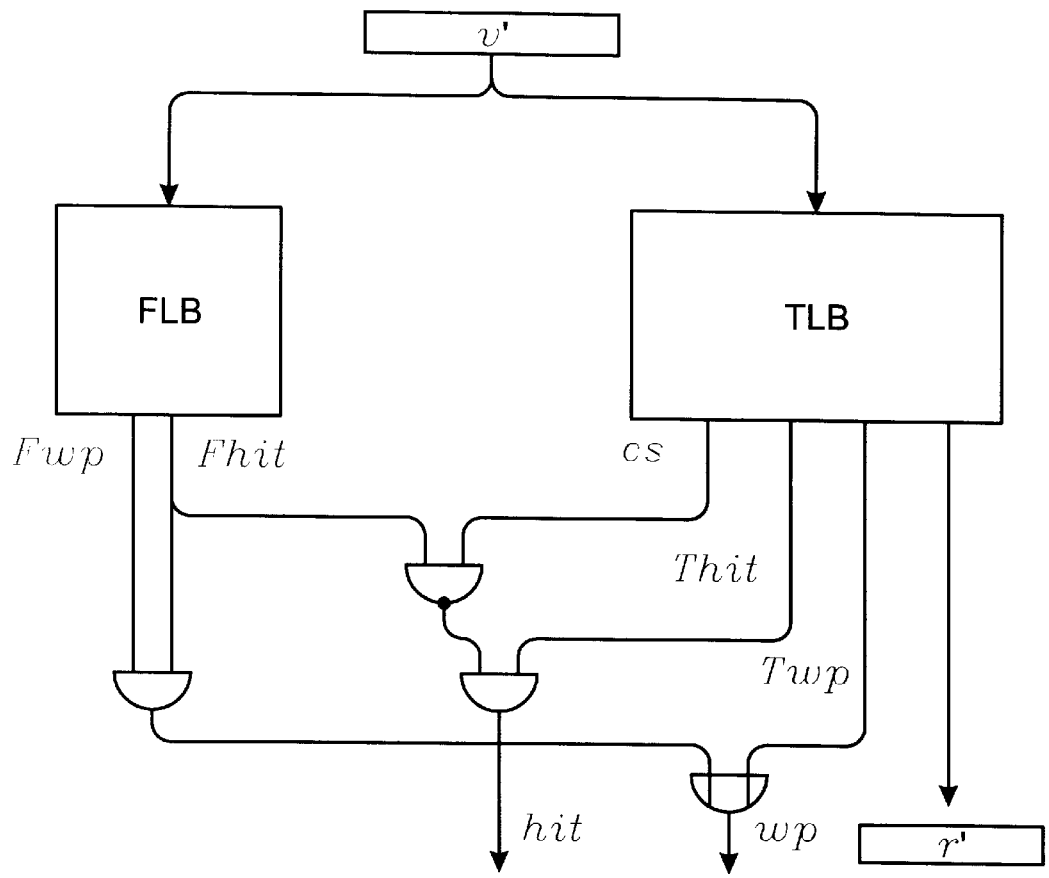
Figure 14:
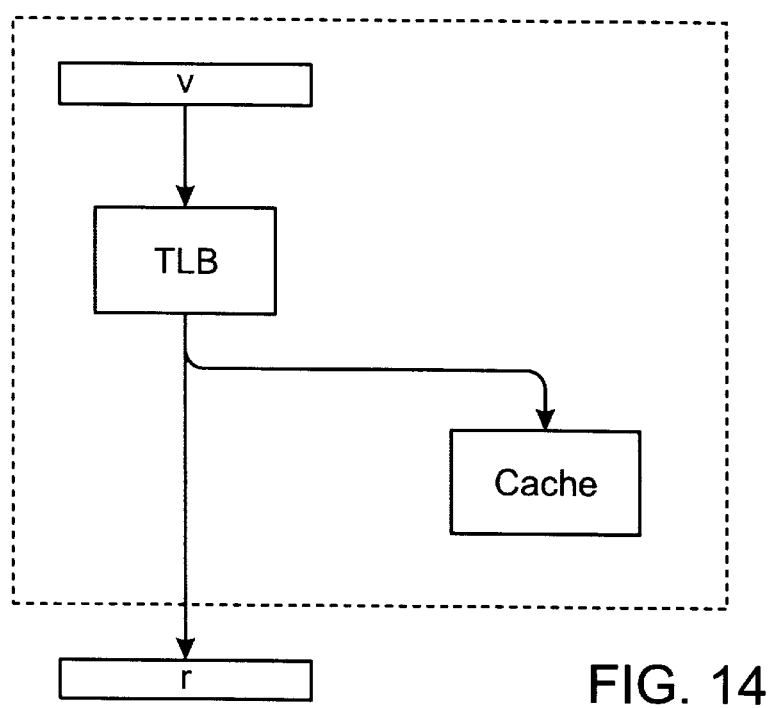
Figure 15:
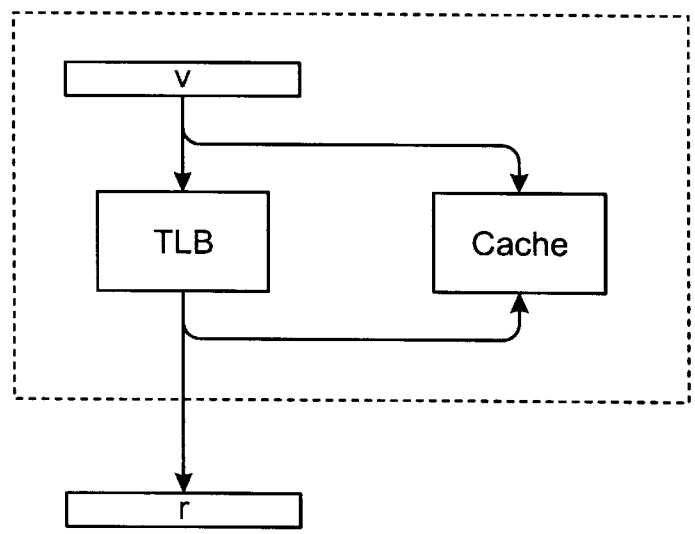
Figure 16:
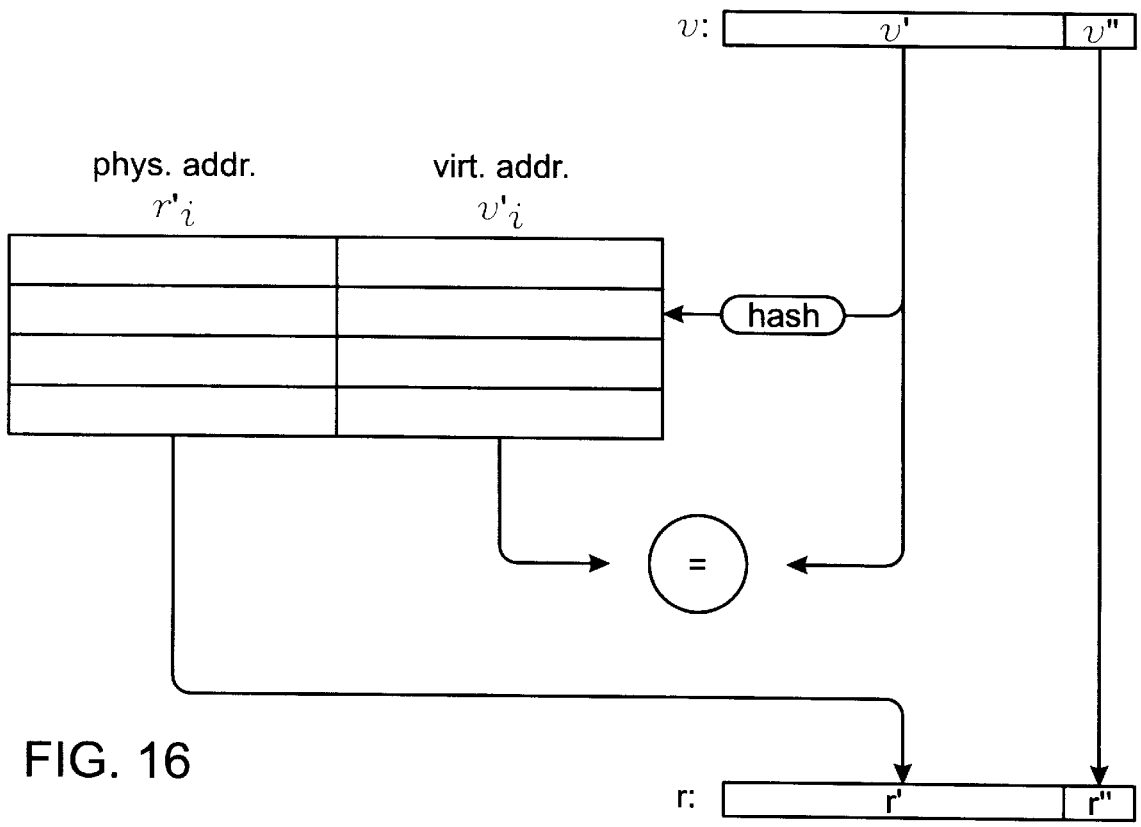

The following is a detailed description of embodiments of the invention, taken in conjunction with the Figures. The Figures show:

FIG. 1 is a schematic illustration of the structure of a "Flush Lookaside Buffer" as a supplement to a given TLB/cache system, FIG. 2 illustrates the structure of a TLB with a status field in the form of a collision sensitive bit, FIG. 3 is a block diagram of a FLB and a TLB with logic wiring, FIG. 4 is a schematic illustration of a FLB structure with generation numbers to mark a restricting status and a non-restricting status, FIG. 5 illustrates the structure of a FLB with generation numbers and without valid bit and Fhit signal, FIG. 6 shows a TLB with generation numbers, FIG. 7 is a block diagram of FLB and TLB, each with generation numbers and logic wiring of the outputs, FIG. 8 shows the structure of a TLB without valid bit and Thit signal, FIG. 9 illustrates the structure (as a block diagram) of FLB and TLB without valid and Thit signal, FIG. 10 shows a TLB with a masked FLB (as a block diagram), FIG. 11 illustrates the basic structure of a simple FLB with activity note, FIG. 12 shows the structure of a shadow TLB, FIG. 13 is a block diagram of a system comprising TLB and FLB with "write protect", FIG. 14 shows the basic structure of a serial cache memory system comprising a TLB and a cache, FIG. 15 illustrates the structure of a parallel cache memory system comprising a TLB and a cache, and FIG. 16 shows a direct mapped TLB (basic structure).

1. Flush Lookaside Buffer 1.1 A simple FLB

Referring to FIGS. 1 to 3, the following is a detailed description of a first embodiment of a memory device according to the present invention, using a TLB memory system. All following considerations (for all embodiments) may be transferred analogously to a cache memory system. It should be noted here that, physically speaking, a TLB is a cache memory.

In order to implement the invention with a TLB system, a small, fully-associative flush lookaside buffer (referred to hereinafter as FLB) is added to the TLB system. Each entry of the FLB has a valid bit and can accommodate the specification of a region $\rho_j$ (FIG. 1).

Here, a region may be specified, for example, by a start and end address or length, but also by an address and a mask indicating which address bits should be used for a hit check and which ones should be ignored.

The FLB signals a hit Fhit if there is at least one entry j that is valid ($valid_j$) and the region $\rho_j$ of which contains the virtual address v.

The TLB is supplemented with a collision sensitive bit $cs_i$ indicating per entry whether a collision with a FLB hit should be observed (cs), i.e., there is a restricting status, or whether it should be ignored ($\overline{cs}$), i.e., there is a non-restricting status. In case of a hit, the TLB signals Thit and provides the physical address r' and the collision sensitive bit cs from the hit entry.

If, upon a translation, there are TLB and FLB hits (Thit∧Fhit), this is referred to as a collision. The collision is true if cs is set as well; otherwise it is false. The overall system ignores TLB hits upon true collisions, i.e., just when a FLB hit is reported, too, and the collision sensitive bit is set, i.e.

$Hit = Thit \land \neg(Fhit \land cs)$.

For a better understanding of this hit aspect, see FIG. 3.

Every time a new TLB entry is stored, the collision sensitive bit $cs_i$ is set if the corresponding virtual address triggers no FLB hit. Otherwise, $cs_i$ is reset in the process. Since TLB entries are usually stored because of a TLB miss (storing access) and, in this case, the corresponding virtual address v' has been processed by the FLB in parallel to the TLB step, the $cs_i$ of the new TLB entry is set to $\overline{Fhit} = \neg Fhit$, or more specifically, to the value of $\overline{Fhit}$ that occurred upon the TLB miss. It should be noted that this is independent of there being a true TLB miss ($\overline{Thit}$) or a true collision.

Upon a TLB hit with a true collision 1. the respective TLB entry is flushed ($valid_i := false$),
2. a TLB miss is signaled and a MMU table walk is performed,
3. since Fhit was set upon the TLB miss, the collision sensitive bit $cs_i$ of the used entry is reset upon a new storing operation.

Addressing the same virtual address again, will then only result in a false collision.

In the following illustration of the interaction of the hit signals, the preconditions for the operations on the right hand side are described on the left hand side of →, respectively. In order to select an alternative, all preconditions listed therefor must be fulfilled (AND operation). All operations separated by a comma are executed in parallel. An overstrike (such as $\overline{Fhit}$) denotes the negation of a signal or a bit, "!" denotes the setting and "¯!" the resetting of a signal or a bit.

$$\begin{cases} Thit \begin{cases} Fhit \begin{cases} cs_i & \to \overline{hit}!, \overline{valid_i}! \\ \overline{cs_i} & \to hit! \end{cases} \\ \overline{Fhit} & \to hit! \end{cases} \\ \overline{Thit} & \to \overline{hit}! \end{cases}$$

Method of FLB Use

If a region $\rho$ overlaps with no region $\rho_j$ already entered in the FLB and there is at least one free FLB entry, the region may be flushed by storing $\rho$ in a free entry and setting the same as valid.

In case of an FLB overflow or an overlapping (a) the FLB and the TLB may be flushed completely, in general by simultaneously resetting all valid bits, (b) or the TLB is only made collision sensitive again, by simultaneously setting all collision sensitive bits $cs_i$, the TLB otherwise remaining intact. The FLB may remain as it is or it may be changed such that, after the change, the union of the regions of all valid FLB entries comprises the corresponding quantity before the change.

1.2 FLB with generation numbers

Referring now to FIGS. 1 to 6, a second embodiment of the present invention will now be described, wherein the status information or the contents of the status field which indicate whether access may be had to the data field of an addressed TLB memory entry addressed by means of an address that is part of an address space region stored in the FLB.

The simple FLB is added with one generation number field $G_j$ per entry. If overlapping of regions in the FLB is not allowed, the generation number $G_j$ of the correct entry in G will be provided upon a FLB hit. With overlapping regions, the highest generation number $G_j$ of all correct ($v' \epsilon \rho_j$) valid entries in G will be provided upon a FLB hit.

An alternative shown in FIG. 5 does without the valid bit and Fhit signal. Here, invalidity is indicated by a reserved minimum generation number $-\infty$. FLB entries are marked invalid by $G_j = -\infty$. Moreover, the FLB provides $G = -\infty$ if there is no hit. For the sake of simplicity in the Figures and the description, the following is always based on this second implementation. An implementation using a valid bit and Fhit signal, which would possibly be more simple and faster under circuitry aspects, can be readily derived from these descriptions.

Instead of a collision sensitive bit, the TLB comprises a generation number $g_i$ per entry (FIG. 6). Upon a TLB hit, the corresponding generation number will be supplied in g. There is a register $\gamma$ that indicates the respective present generation. Initially or after each FLB flushing it holds, for example, the value 1. Whenever the contents of the FLB is changed, the generation is incremented by one. Upon each loading of a TLB entry, its generation number is set to the present generation $g_i := \gamma$.

A collision is given for Thit$\wedge$G$>-\infty$. It is true if $G \geq g$ holds, see FIG. 7. With a suitable use of $\gamma$ and the FLB field $G_j$, another addressing of the same virtual address will only lead to a false collision, so that the following holds:

$$\begin{cases} Thit \begin{cases} G < g & \to hit! \\ G \geq g & \to \overline{hit}!, valid_i := \text{false} \end{cases} \\ \overline{Thit} & \to \overline{hit}! \end{cases}$$

If 0 is used as a representation of $-\infty$ and disposes of k bits for each generation number field $g_i$ in the TLB, 1 to $2^{k-1}$ may be used as valid generation values.

Methods of FLB Management

The concrete flush semantics is substantially defined by the management of the FLB. Two methods shall be sketched as examples.

(a) If the generation number fields are sufficiently wide, the value of $\gamma$ in $G_j$ can be taken over at each new FLB entry and the register $\gamma$ may then be incremented by 1. Then, overlapping with other FLB entries is of no importance anymore. Should an FLB overflow occur, the FLB and the TLB will be flushed and $\gamma$ will be reset.

(b) In may cases, however, one can also do with narrower generation number fields by employing an extension of the method described under 1.1. Here, $G_j$ of a new FLB entry is always set to $\gamma$, thereafter, however, the register $\gamma$ will only be incremented by 1 if there is an overlapping of the new region $\rho$ to be entered with at least one of the valid $\rho_j$. Otherwise, $\gamma$ remains unchanged. Should the FLB overflow or the present generation number $\gamma$ become too large, the FLB and TLB will be flushed and $\gamma$ reset.

Instead of a complete TLB flush, it is also possible in method (b) to make the TLB collision sensitive by simultaneously resetting all generation numbers $g_i$, e.g. to 1. The FLB may then remain as it is or it may be changed such that the total of all valid FLB entries after the change covers at least the corresponding regions valid before the change.

Without Valid Bits and Thit Signal

Using the reserved minimum generation number $-\infty$, one may dispense with the valid bit and Thit signal also in the TLB, by setting $g_i = -\infty$ for invalid TLB entries, considering only entries with $g_i > -\infty$ for multi-way set-associative TLBs and always providing $-\infty$ in g if there is no hit. This model is shown in FIGS. 8 and 9.

The following holds:

$$\begin{cases} G < g & \to hit! \\ G \geq g \begin{cases} g = -\infty & \to \overline{hit}! \\ g > -\infty & \to \overline{hit}!, g_i := -\infty \end{cases} \end{cases}$$

It is of particular interest in this model that one bit per entry is saved in the TLB. If, for example, the two bits $cs_i$ and $valid_i$ are replaced with a 2 bit field $g_i$ and the value 0 is used as $-\infty$, the same memory effort already allows for three true generations.

However, making collision sensitive by resetting all valid ($g_i > 0$) generation numbers is no longer readily done with a view to wiring.

1.3 FLB and TLB with Generation Masks

Instead of he generation numbers one may also use bit masks; instead of the arithmetic comparison <, a "bit-wise ANDing" will then be necessary.

1.4 TLB with Masked FLB

If the generation number or mask is sufficiently wide, one may omit the generation information $G_j$ in the FLB and understand $g_i$ as addresses of FLB entries. As illustrated in FIG. 10, the FLB will then provide a signal Fhit$_j$ for each entry j. All these signals will be ORed masked, with k FLB entries:

$$Xhit = (Fhit_0 \wedge m_0) \vee (Fhit_1 \wedge m_1) \vee \ldots \vee (Fhit_{k-1} \wedge m_{k-1})$$

Here, the mask ($m_0, m_1, \ldots, m_{k-1}$) is either stored directly in the TLB entry and provided as g, or it is generated from the g provided, for example, as $-2^g$. For $\neg Xhit \wedge Thit$, there is a hit, for $Xhit \wedge Thit$, there is a true collision. The following holds:

$$\begin{cases} Thit \begin{cases} Xhit & \to \overline{hit}!, valid_i := \text{false} \\ \overline{Xhit} & \to hit! \end{cases} \\ \overline{Thit} & \to \overline{hit}! \end{cases}$$

1.5 FLB with Activity Note

Some FLB modes flush the TLB or make it entirely collision sensitive again, when a new region to be entered in the FLB overlaps with already present ones. In order to reduce the number of such events, one may differentiate between active and inactive entries in the FLB: each entry will become active only when it causes a true collision for the first time. Inactive entries may then be extended or used for another flushing without a need for a true FLB or TLB flush.

Each FLB entry is extended by one activity bit $actv_j$. This is illustrated in FIG. 11 for a simple FLB with valid bits and without generation numbers. The other FLB types are extended in the same manner by adding the activity bits. Upon loading a FLB entry anew, the activity note is always reset. Only upon a true collision, will the activity bits of all matching ($\forall v' \epsilon \rho_j: actv_j!$) FLB entries be set, where invalid entries may be ignored, however. It should be noted that a plurality of activity bits must only be set if overlaps of regions could occur in the FLB. Otherwise, there is only exactly one matching FLB entry in a true collision.

For a simple FLB and TLB with collision sensitive and valid bits, the following holds:

$$\begin{cases} Thit \begin{cases} Fhit \begin{cases} cs_i & \to \overline{hit}!, \overline{valid_i}!, \forall v' \in \rho_j : actv_j! \\ \overline{cs_i} & \to hit! \end{cases} \\ \overline{Fhit} & \to hit! \end{cases} \\ \overline{Thit} & \to \overline{hit}! \end{cases}$$

For FLBs with generation numbers $G_j$ and TLBs with generation numbers $g_i$, as well as valid bits, the following holds:

$$\begin{cases} Thit \begin{cases} G < g & \to hit! \\ G \geq g & \to \overline{hit}!, valid_i := false, \forall v' \in \rho_j : actv_j! \end{cases} \\ \overline{Thit} & \to \overline{hit}! \end{cases}$$

For FLBs with generation numbers $G_j$ and TLBs with generation numbers $g_i$ without valid bits, the following holds:

$$\begin{cases} G < g & \to hit! \\ G \geq g \begin{cases} g = -\infty & \to \overline{hit}! \\ g > -\infty & \to \overline{hit}!, g_i := -\infty, \forall v' \in \rho_j : actv_j! \end{cases} \end{cases}$$

For TLBs with masked FLB, the following holds:

$$\begin{cases} Thit \begin{cases} Xhit & \to \overline{hit}!, valid_i := false, \forall v' \in \rho_j : actv_j! \\ \overline{Xhit} & \to hit! \end{cases} \\ \overline{Thit} & \to \overline{hit}! \end{cases}$$

If a region ρ overlaps with no region $\rho_j$ already entered in the FLB, which is also active ($actv_j$) and with at least one FLB entry free, the region may be flushed by loading ρ into a free entry and setting the same valid.

Moreover, inactive ($actv_j$) FLB entries may be modified or enabled. The only requirement for the observation of the flush semantics is that the total of all valid FLB entries after the change covers at least the corresponding regions valid before the change.

2. Other FLB Possibilities 2.1 Selective TLB Flushing

The TLB may be flushed selectively by sequentially testing the fields $v'_i$ of all valid TLB entries against the FLB. Should the FLB report a hit at $v_i$, this TLB entry is made invalid. When the entire TLB has been scanned in this way, all FLB entries may be enabled that were left unchanged since the beginning of the scanning. In particular, the entire FLB may be flushed if there were no changes in the FLB during the scanning.

The TLB scanning may be sped up by the factor n for n-way TLBs by testing the respective n associated TLB entries in parallel. Depending on the speed of the FLB, the same must be multiplied to this end.

In order to permit a normal address translation by the TLB in parallel to the scanning, the system may be extended by a "shadow" TLB, see FIG. 12. In contrast to the TLB, the shadow TLB is no associative, but a directly addressed memory. In updates due to TLB changes, the TLB addresses can be taken over. The shadow TLB duplicates the virtual address and the validity and collision information of each TLB entry. For TLBs with a collision sensitive bit, the following is true for the entries of the shadow TLB (see FIG. 12):

$w_i = v_i, x_i = valid_i \wedge cs_i,$ for TLBs with generation number and valid bit, the following holds:

$w_i = v_i, x_i = (valid_i, g_i),$ and for TLBs with generation number without valid bit, the following is true:

$w_i = v_i, x_i = valid_i = g_i.$

Changes in the corresponding TLB fields are immediately propagated to the shadow TLB. Selective flushing is done by scanning the shadow TLB. If an entry to be flushed is found in the process, the flush operation is executed for the shadow TLB and the actual TLB.

2.2 FLB as Temporary TLB

FLB entries may be extended by fields that are also latched in the TLB, for example, access attributes. When these are changed (limited) for a region, it will suffice upon a Fhit to take over the corresponding information from the FLB. A table walk will become unnecessary.

FIG. 13 illustrates, as an example, a FLB also including a write protect signal per region, which is supplied upon a FLB hit in Fwp. The final write protect signal wp is formed as Twp v (Fhit∧Fwp), Twp being the write protect signal supplied by the TLB. Thus, a region may be temporarily write protected without there being a need for additional TLB misses and, thus, table walks.

This method can also be used for virtual aliasing and call-on reference. The method described under 2.1 may be extended such that TLB entries are not flushed, if possible, but are changed according to the information from the FLB.

2.3 Overlaps in the FLB

In larger FLBs, it may become complex to determine whether a new region $\rho = [\check{\rho}, \hat{\rho}]$ overlaps with regions already validly entered $\rho_j = [\check{\rho}_j, \hat{\rho}_j]$. As a fully associative element, the FLB can make this decision in two steps, independent of its size; however, the complexity and the costs of the FLB will be increased thereby.

Each FLB entry will be extended by the bit $low_j$. In the beginning of a check for overlapping, all $low_j$ bits and the Fhit signal are reset. The FLB is offered the lower limit $\check{\rho}$ of the new region and each element executes step 1 according to the following rule:

$$\begin{cases} G_j > -\infty \begin{cases} \check{\rho} \in \rho_j & \to hit! \\ \check{\rho} < \check{\rho}_j & \to low_j! \end{cases} \end{cases}$$

Then, the FLB is offered the upper limit $\hat{\rho}$, and each element executes step 2 according to the following rule:

$$\begin{cases} G_j > -\infty \begin{cases} \hat{\rho} \in \rho_j & \to hit! \\ \hat{\rho} \geq \hat{\rho}_j, low_j & \to hit! \end{cases} \end{cases}$$

If the signal Fhit is set after step 2, there is an overlapping.

2.4 Caches

All listed methods may be implemented just as well with caches instead of TLBs. The table walk with new loading of a TLB entry will then be replaced with a main memory access.

What is claimed is:

1. An address translation device comprising:

a TLB having one or more entries being valid or invalid each, and a region lookaside buffer having one or more entries each specifying a region of an address space, and controlling address translation, TLB update and flush operations, where each valid TLB entry, is considered to be invalid for address translation and results in a miss if the valid TLB entry matches an address space region entry contained in the region lookaside buffer, and is considered to be valid for address translation and results in a hit otherwise, wherein an effective TLB hit occurs based on a prior condition of a TLB hit and a FLB miss, an effective TLB miss occurs based on a prior condition of said TLB hit and a FLB hit and a TLB entry loaded before flush, said effective TLB hit occurs based on a prior condition of said TLB hit and said FLB hit and said TLB entry loaded after flush, and each of said TLB entry is supplemented by a collision-sensitive bit such that any valid TLB entry is considered to be invalid for address translation and results in a miss if the valid TLB entry matches said address space region entry contained in the region lookaside buffer, and the collision-sensitive bit of the valid TLB entry is set, and is considered to be valid for address translation and results in a hit otherwise, wherein upon loading said TLB entry, the collision sensitive hit of said TLB entry is automatically reset if the corresponding address matches said address space region entry of the region lookaside buffer, and set otherwise.

2. The device of claim 1, where, when upon a TLB translation, the addressed valid TLB entry set to invalid, if the valid TLB entry matches an address space region entry in the region lookaside buffer.

3. The device of claim 1 or 2, wherein each TLB entry and each entry of the region lookaside buffer are supplemented by a generation field specifying the age of the entries, where each valid TLB entry is considered to be invalid for address translation and results in a miss if the valid TLB entry matches an address space region entry contained in the region lookaside buffer, and the generation field of the valid TLB entry specifies a younger generation than the generation field of the address space region entry of the region lookaside buffer, and is considered to be valid for address translation and results in a hit otherwise.

* * * * *